United States Patent [19]

Espe

[11] 3,769,592

[45] Oct. 30, 1973

[54] SQUENCH CIRCUIT WITH TIME DELAY VARIABLE IN ACCORDANCE WITH STRENGTH OF RECEIVED SIGNAL

[75] Inventor: Roy H. Espe, Scottsdale, Ariz.

[73] Assignee: Motorola, Inc., Franklin Park, Ill.

[22] Filed: July 14, 1971

[21] Appl. No.: 162,576

[52] U.S. Cl. .................. 325/478, 325/348, 325/403

[51] Int. Cl. .............................................. H04b 1/10

[58] Field of Search .................... 325/319, 348, 402, 325/403, 404, 408, 410, 473, 477, 478, 480, 322–324; 324/98, 99, 133; 328/146–148, 151, 162, 165, 167; 329/178, 179

[56] References Cited

UNITED STATES PATENTS

| | | | |
|---|---|---|---|
| 3,671,866 | 6/1972 | Rutherford et al. | 325/322 |
| 3,681,698 | 8/1972 | McEvoy | 325/324 |
| 3,479,599 | 11/1969 | Molik | 325/323 |
| 3,660,765 | 5/1972 | Glasser et al. | 325/478 |
| 3,496,481 | 2/1970 | Torick et al. | 325/478 |
| 3,462,691 | 8/1969 | McDonald | 325/478 |
| 3,479,599 | 11/1969 | Molik | 325/478 |

*Primary Examiner*—Robert L. Griffin
*Assistant Examiner*—Marc E. Bookbinder
*Attorney*—Mueller & Aichele

[57] ABSTRACT

Squelch circuit for communications receiver with relatively long time delay to prevent squelch action because of flutter or fade when operating on weak signals, with effective short time delay on strong signals to eliminate the squelch tail, and with continuously variable delay as an inverse function of signal strength at intermediate signal levels. A voltage which varies with signal strength (inversely with noise) is derived from receiver noise and provides a control voltage which is compared with a reference voltage to turn on the audio when a signal of usable strength is received. A circuit which responds to the level of the derived voltage operates to modify either the control voltage or the reference voltage so that the control voltage is only slightly greater then the reference voltage when strong signals are received, and is substantially greater than weak signals. Upon termination of a received signal the control voltage decays and acts to turn off the audio in a length of time proportional to the difference in control and reference voltage. This results in fast squelch action for strong signals, so that the squelch tail will be quite short, slower squelch action for weak signals, to give flutter and fade protection, and continuously variable squelch action for signals of intermediate strengths.

15 Claims, 6 Drawing Figures

INVENTOR
ROY H. ESPE
BY
Mueller & Aichele
ATTYS.

SQUENCH CIRCUIT WITH TIME DELAY VARIABLE IN ACCORDANCE WITH STRENGTH OF RECEIVED SIGNAL

This invention is related to the invention described and claimed in my prior U.S. Pat. No. 3,628,058, issued Dec. 14, 1971.

BACKGROUND OF THE INVENTION

Squelch circuits for controlling the audio output of a communications receiver are well known but present the problem that a squelch circuit having a relatively long time delay, so that it does not turn the audio on and off if the signal flutters or fades, will allow a squelch tail or burst of noise at the end of a transmission before cutting off the audio output of the receiver. It is also known to provide dual time constant squelch circuits wherein the effective time constant of the circuit is relatively long for weak signals and is relatively short for strong signals. Although this eliminates the squelch tail at the termination of signals which are above a specified level, there is an intermediate range where the signal is not strong enough to cause the circuit to operate in the short time constant mode so that a relatively long squelch tail will still be produced.

Although it is desired to provide a squelch circuit which is effective to hold a receiver operative so that the audio is not interrupted during temporary weak signals, as during fading, and also to prevent the occurrence of a long squelch tail at the end of strong signal transmissions, it is also desired in many applications that the circuitry for providing squelch operation be as simple as possible and require a minimum of operative power. Also, it is desired that the circuit be suitable for construction in integrated circuit form so that it can be provided very compactly, and cost savings resulting from integrated circuit construction are obtained.

SUMMARY OF THE INVENTION

It is an object of this invention to provide an improved squelch circuit for a communications receiver wherein the effective time constant of the circuit is variable with the strength of the received signal.

Another object of the invention is to provide a squelch circuit which has, in effect, a long time turn-off delay upon initial reception of a signal and upon continuous reception of a signal which is relatively weak, and wherein the effective time delay is modified in accordance with the strength of the received signal so that on strong signals the delay is relatively short to eliminate or substantially reduce the duration of the squelch tail.

A further object of the invention is to provide a squelch circuit with a noise detector having a short time constant load so that the derived voltage closely follows the strength of the received signal, with a control voltage produced by the derived voltage being compared to a reference voltage and acting in response to a usable signal to enable the audio of the receiver, wherein the reference voltage is modified in accordance with the signal strength so that on strong signals the audio is disabled very soon after the signal terminates.

An additional object of the invention is to provide a squelch circuit which enables the audio output of a receiver when a control voltage produced in response to a received signal exceeds a reference voltage, wherein the control voltage is varied in accordance with signal strength so that on weak signals the audio is not disabled in the presence of fading, and on strong signals the audio is cut off immediately after the signal terminates.

In accordance with the invention a squelch circuit for a communications receiver, which may be a frequency modulation receiver, is constructed in integrated circuit form and includes noise amplifiers and a noise detector for producing a voltage which serves as a measure of the strength of a received signal. The detected voltage may be inversely related to the noise level, which in an FM receiver is inversely related to the signal strength, so that the detected signal will vary directly with the signal strength. The detected signal is compared to a first reference voltage and, when it exceeds the reference voltage, renders an emitter-follower circuit conductive to rapidly charge a capacitor. The voltage across the capacitor is applied to a comparator to which a second reference voltage is applied. When the voltage across the capacitor exceeds the reference voltage, the comparator may operate audio switches to remove disabling shunt circuits from the audio stages of the receiver.

A discharge path is provided for the capacitor so that the voltage thereacross falls when the received signals terminates. The time constant of the discharge is slow so that there will be a time delay in cutting off the audio. This delay is desired on weak signals so that the audio will not be cut off during flutter or fading of the signal. However, on strong signals it is desired that the audio be cut off quickly so that the squelch tail will be eliminated. This is accomplished by increasing the reference voltage in the presence of strong signals so that the capacitor need only discharge a small amount before the comparator turns off the audio. This is done by applying the detected noise signal to a second circuit which produces a control voltage which varies with the strength of the detected signal. This control voltage is used to modify the second reference voltage to increase the reference voltage on strong signals. A delay is provided in the second circuit so that when the signal terminates, the control voltage does not change significantly until the capacitor discharges enough to turn off the comparator.

In a second embodiment, the control voltage is applied to the circuit for charging the capacitor so that on strong signals the capacitor is charged to a lower voltage, (near the second reference voltage) and need be discharged only a small amount to operate the comparator to turn off the audio stages.

DETAILED DESCRIPTION

Figures 1, 3:
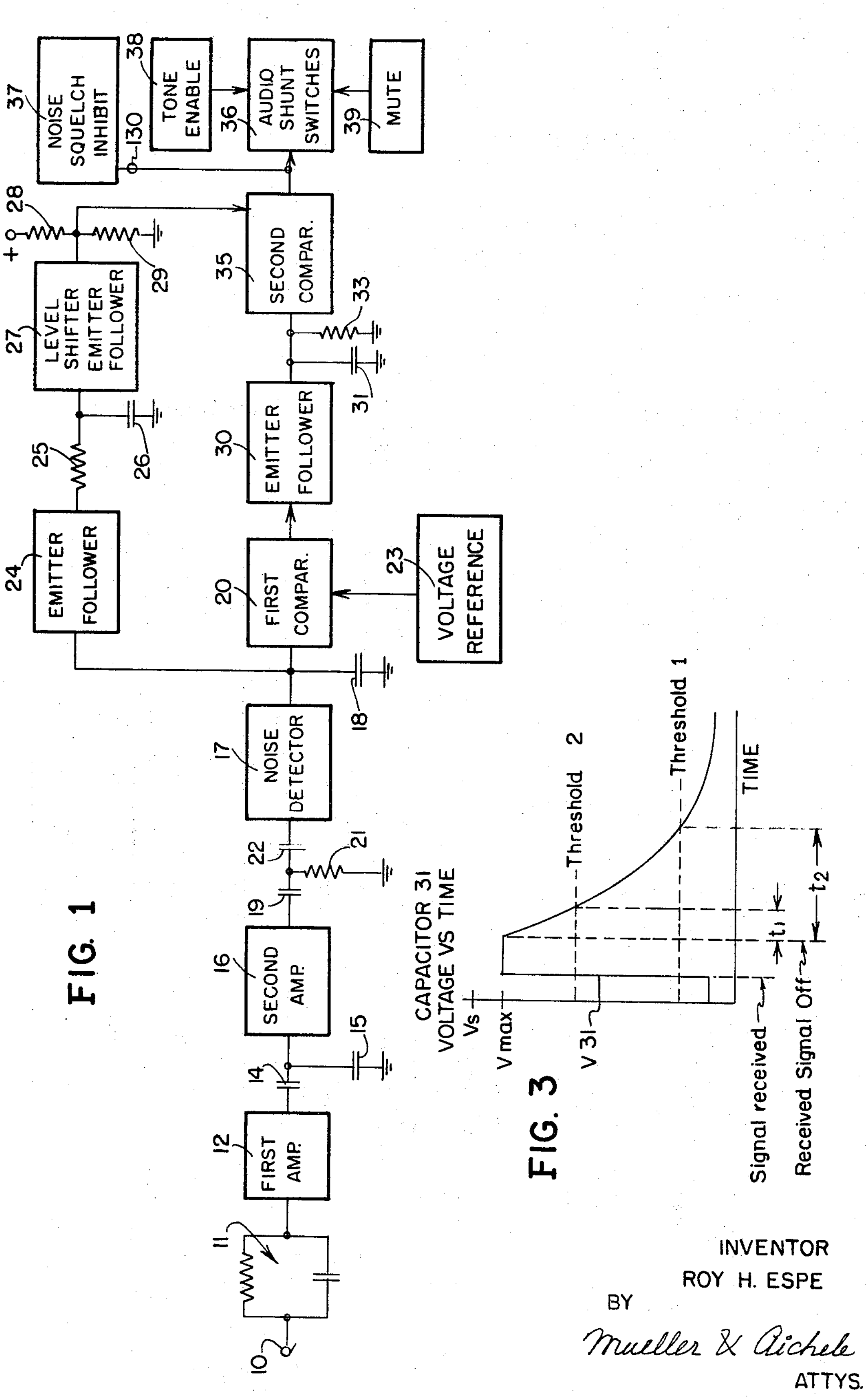
FIG. 1 is a block diagram of a squelch control circuit in accordance with the invention.
FIG. 3 is a curve illustrating the operation of the squelch circuit of FIGS. 1 and 2.

Referring to the drawings, in FIG. 1 there is shown a block diagram of a squelch circuit of the invention. This circuit can be used with a frequency modulation receiver, and signals from the receiver discriminator may be applied to input terminal 10 and through frequency shaping circuit 11, which selects the frequency band sampled and provides the signals to the input of a first amplifier 12. The shaping circuit 11 sets the ratio of the audio to noise voltage driving the first amplifier 12 and causes the amplifier 12 to be driven to limiting by the audio signals to eliminate audio signal blocking. The amplified noise output signals from the first amplifier 12 are AC coupled by capacitors 14 and 15 to a second amplifier 16, which provides additional gain for the noise signal to be processed by the squelch filter circuit.

The second amplifier 16 is coupled to a noise detector circuit 17 through a high-pass filter circuit including a capacitor 19 and the parallel combination of a resistor 21 and the input impedance of the detector 17, with the charge accumulating on capacitor 22 providing for a voltage doubling action of the noise detector circuit 17. The value of the resistor 21 is chosen to swamp the input impedance of the detector circuit 17 to thereby reduce the effect of variations in the input impedance of the detector, rendering it less sensitive to device variations.

The detector noise voltage at the output of the noise detector circuit 17 increases with received signal strength in the system described. It is pointed out, however, that the system of the invention could be adapted for use with a noise detector circuit of a different type, such as one in which the detector output would increase with noise. The detector output is coupled to a short time constant noise filter in the form of a capacitor 18, with the filter being operative to reduce the ripple of the detected noise voltage. This filtered noise voltage is applied to the input of a first comparator circuit 20, which is switched or actuated at a voltage level determined by a voltage reference circuit 23. This reference is chosen so that the first comparator 20 can be actuated by very weak signals. The detector noise voltage across capacitor 18 is also applied to another circuit path including emitter-follower 24, as will be described.

When the detected noise voltage present on the capacitor 18 exceeds the threshold voltage of the first comparator circuit 20, the comparator 20 is actuated and drives an emitter-follower circuit 30 into conduction to charge a charge storage capacitor 31 to a predetermined fixed voltage level. Any time the threshold of the first comparator circuit 20 is exceeded by the voltage present on the noise filter 18, the capacitor 31 is charged to the same voltage level, irrespective of the signal strength, once the signal strength exceeds the minimum threshold. The discharge path for the capacitor 31 is through a resistor 33 providing a long time constant for such discharge. The voltage stored on the capacitor 31 is applied to one input of a second comparator circuit 35.

The voltage across capacitor 18 controls the conduction of emitter-follower circuit 24 to charge capacitor 26 through resistor 25. The voltage across capacitor 26 is applied through level shifter and emitter-follower circuit 27 to modify the second reference voltage provided by the voltage divider including resistors 28 and 29. This controls the reference voltage applied to the second comparator 35. Capacitor 26 provides a delay so that the second reference voltage is not changed for a given time interval after disappearance of the received signal.

The second comparator 35 provides an output when the capacitor 31 is charged to a voltage greater than the second reference voltage to cause the audio shunt switches 36 to be disabled. These switches are connected to the audio circuit of the receiver and, when conducting, shunt the same to prevent reproduction of the audio signal. When the switches are disabled the audio signal is amplified and reproduced by the audio system. To provide other known squelch circuit features, a noise squelch inhibit circuit 37, a tone enable circuit 38 and a mute circuit 39 may be coupled to the audio switches 36.

When the detected noise voltage across capacitor 18 drops, which voltage varies inversely with the level of noise and directly proportional to the strength of a signal received by the receiver, the first comparator 20 turns off emitter-follower 30. The charge on capacitor 31 is reduced slowly by action of resistor 33. Since resistor 33 has a value to provide a long time constant, this will normally hold the second comparator 35 operative for a relatively long time after the noise voltage drops. However, the emitter-follower 24 and level shifter and emitter-follower 27 act to increase the second reference voltage applied to the second comparator 35 in the presence of strong signals. Accordingly, a slight drop in the voltage across capacitor 31 due to its discharge will cause the second comparator circuit 35 to be disabled so that the audio is rapidly cut off. This acts to reduce the length of the squelch tail when the signal level is strong.

Figure 2:
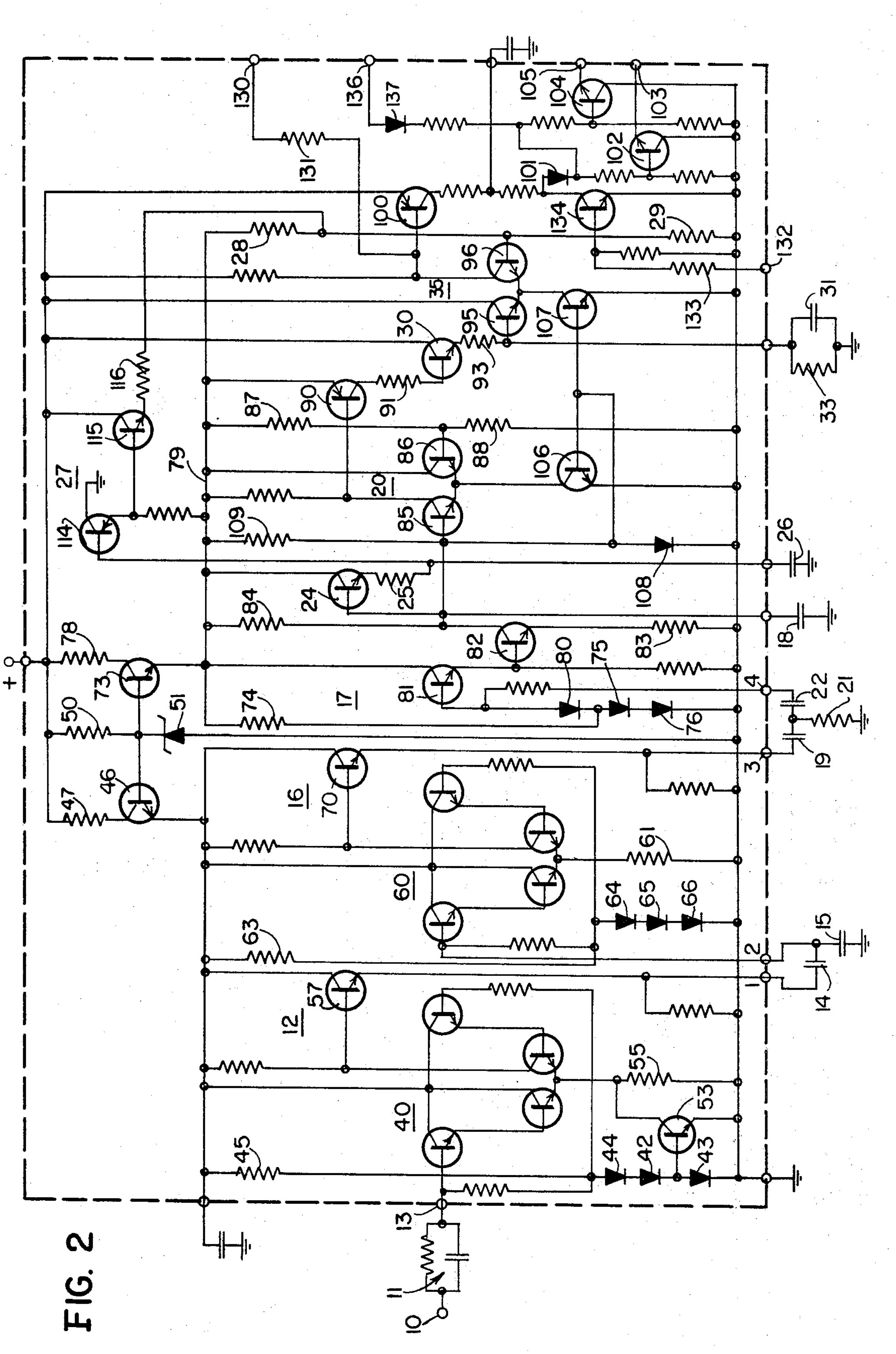
FIG. 2 is a circuit diagram of the squelch circuit of FIG. 1.

Referring now to FIG. 2, there is shown a detailed schematic diagram of the noise detection and squelch circuit shown in block diagram form in FIG. 1, with the portion of the circuit shown in dotted lines in FIG. 2 capable of being formed on a single silicon semiconductor integrated circuit chip. The components which are not on the chip are shown outside the dotted lines.

In the circuit shown in FIG. 2, the signals from the radio receiver discriminator are applied to the input terminal 10 through the frequency shaping network 11 to terminal 13 on the chip of a first amplifier 12 which includes a Darlington differential amplifier 40 and an emitter-follower 57. A reference or bias potential for the amplifier 40 is obtained from the voltage drop across three diodes 41, 42 and 43. These diodes form a part of a voltage divider, including resistor 45, coupled to the emitter of an emitter-follower regulator transistor 46, the collector of which is connected through a collector impedance 47 to a source of positive potential. To establish the operating potential applied to the differential amplifier 40 and to the voltage divider 41, 42, 43 and 45, the base of the regulator transistor 46 is coupled to a further voltage divider including a resistor 50 and a zener diode 51 connected between the source of positive potential and ground, with the voltage drop across the zener diode 51 establishing the operative point of transistor 46.

Even though the operating voltage obtained from the emitter of transistor 46 is regulated by virtue of the voltage drop across the zener diode 51, the operating point of the differential amplifier 40 may exhibit variations with temperature because of the temperature coefficients of the resistors and diodes formed as part of the integrated circuit chip. In order to compensate for the temperature variations, which otherwise would cause variations in the gain of differential amplifier 40, two current sources for the amplifier 40 are employed. One current source is the collector current of an NPN current source transistor 53, biased in known manner by diode 43, and the other current source is formed by resistor 55, which is connected in parallel with the collector-emitter path of transistor 53. These two current sources exhibit opposite temperature coefficients, and by proper adjustments of the values of resistors 45 and 55, it is possible to obtain a range of temperature coefficients for the operating current for amplifier 40 between the two extremes provided by the current sources. For the purposes of illustration of the operation of this circuit shown in FIG. 2, the temperature coefficient of the first amplifier stage 40 is chosen to be near zero.

The output of differential amplifier 40 is coupled through the NPN emitter-follower transistor 57 to the bandpass circuit including capacitors 14 and 15. The signal across capacitor 15 is applied to the input of a second amplifier 16 which includes a second Darlington differential amplifier 60 and emitter-follower 70. This second amplifier 16 is similar to the amplifier 40, except that only a single current source in the form of resistor 61 is used for the differential amplifier 60. This causes the amplifier 60 to have a negative temperature coefficient of gain. The bias potential for differential amplifier 60 is obtained from a voltage divider including resistor 63 and three diodes 64, 65 and 66 connected between the emitter of regulator transistor 46 and ground. In all other respects, the operation of differential amplifier 60 is the same as the operation of amplifier 40 to provide additional gain for the noise signal being processed by the circuit.

The output of the differential amplifier 60 is applied through the emitter-follower transistor 70 and the coupling circuit 19, 21 and 22, previously described, to the input of noise detector stage 17. It should be noted that the emitter-followers 57 and 70 are provided to buffer the outputs of the respective differential amplifier stages 40 and 60 to minimize the loading effects of the following circuitry on the stage gains.

The noise detector 17 is a peak-to-peak amplifying detector with operating potential being obtained from the emitter of a second emitter-follower regulator transistor 73. A reference point for regulator transistor 73 is derived from the voltage drop across the zener diode 51, as for the emitter-follower regulator transistor 46. The collector of the transistor 73 is coupled through a collector resistor 78 to the source of positive potential.

The NPN emitter-follower regulator transistor 46 provides the operating potential for the differential amplifiers 40 and 60, and the regulator transistor 73 provides the operating potential for the noise detector 17 and the squelch switching circuits. By utilizing two separate regulators, the amplifier stages are isolated from the transient producing switch circuits, and the regulators themselves both operate to decouple these same stages of the circuit from external supply variations and noise. The collector resistors 47 and 78 limit the maximum current drain of the regulator circuits in the event of an accidential short circuit external to the integrated circuit chip.

DC biasing potential for the detector stage 17 is obtained from the voltage drop across the diodes 75 and 76 and is applied through another diode 80 to the base of an NPN transistor 81, which is an emitter-follower driving an amplifying detector transistor 82, the emitter of which is connected through resistor 83 to ground. The collector of transistor 82 is connected through load resistor 84 to the regulated supply conductor 79, and this point further is connected to the noise detector output filter capacitor 18.

As stated previously, the capacitor 18 is used to store the detected noise voltage, and the charge accumulated by the capacitor 18 is a direct function of the signal strength (inverse to noise), the charge being at its lowest level with no signal and increasing in the positive direction with increasing signal strength (decreasing noise). This voltage stored by the capacitor 18 then is utilized to operate the squelch circuit in the receiver. The time constant of the detected noise voltage filter capacitor 18 is a short time constant, so that upon termination of a signal, or an increase in the noise into the detector 17, the capacitor 18 is rapidly discharged by the detector transistor 82.

It should be noted that the two diode voltage drop across the diodes 75 and 76 is insufficient to forward bias the transistors 81 and 82 into conduction, due to the inclusion of the transistor diode 80 in the series path with the base-emitter junctions of the transistors 81 and 82. The diodes 75 and 76, however, provide a standby bias which biases the transistors 81 and 82 very near conduction in order to obtain a high detection sensitivity.

The forward voltage drops across diode 80 and the base-emitter junctions of the transistors 81 and 82 subtract from the input noise voltage applied to the detector 17. The changes of these voltages with temperature, and the shift in the filter output of the detector appearing as the voltage stored by the capacitor 18, are compensated for by varying the drive to the detector with temperature. The negative temperature coefficient provided by the current source resistor 61, employed for the differential amplifier 60, provides this compensation. The output of the detector is permitted to change with temperature only by an amount sufficient to track the corresponding changes of the reference voltages applied to the squelch switching circuit in the remaining portion of the circuit shown in FIG. 2 because of changes in the regulated voltage.

By causing the value of the resistor 21 to be less than the input impedance of the detector stage 17, input impedance variations of the detector circuit 17 are swamped out by the resistor 21, so that they have reduced effect on the frequency shaping determined by the capacitor 19 and the resistor 21. The response times for the detector circuit 17 are controlled by the values of the capacitors 22 and 18, and these capacitors are made as small as possible to maintain fast attack and fast decay.

The detected noise voltage present on capacitor 18 is applied to one input of the first comparator 20, which includes transistors 85 and 86. The voltage across capacitor 18 is applied to the base of transistor 85, and a first reference voltage derived from the regulated potential on line 79 by the voltage divider formed by resistors 87 and 88 is applied to the base electrode of transistor 86. The reference voltage is selected so that with no received signal, transistor 86 will be rendered conducting and transistor 85 will be nonconducting. The collector of transistor 85 is connected to the base of PNP lateral transistor 90, and when transistor 85 is nonconducting, no current is drawn through the base of transistor 90 rendering transistor 90 nonconducting. Emitter-follower transistor 30 is connected to the collector of transistor 90 and when transistor 90 is nonconducting, there is no bias on the base of transistor 30 causing it to also be non-conducting.

When signals are received, capacitor 18 is charged to apply a voltage to the base of transistor 85 to render this transistor conducting. When the signal level increases so that transistor 85 conducts more than transistor 86, transistor 90 is rendered conducting to apply a positive potential through resistor 91 to the base of transistor 30 to render the same conducting. Capacitor 31 is, therefore, rapidly charged through the collector-emitter path of transistor 30 and a low value resistor 93. The capacitor 31 is charged substantially to the regulated potential on conductor 79, less the base emitter drop of transistor 30 and the saturation voltage of transistor 90. Transistor 30 will cut off when the voltage on capacitor 18 drops and causes the comparator to switch back to the state where transistor 85 is nonconducting. As previously stated, resistor 33 has a high value so that capacitor 31 discharges slowly therethrough, to provide a long time constant.

The voltage produced by the charge stored on capacitor 31 is applied to the base of transistor 95 of the second comparator 35, which includes transistor 95 and transistor 96. The base of transistor 96 is connected to the voltage divider including resistors 28 and 29, which provides the second reference voltage for normally holding transistor 96 conducting. This causes the collector of transistor 96 to draw current from the base of transistor 100 and cause transistor 100 to conduct. This applies forward bias through diode 101 to transistors 102 and 104 rendering them conducting.

The second reference voltage applied to the base of transisotr 96 is substantially less than the supply voltage, and when the voltage across capacitor 31 reaches a value greater than this reference voltage, transistor 95 is rendered conducting to cause transistor 96 to be cut off, so that the voltage at the collector of transistor 96 rises to the positive supply potential. This positive potential is applied to the base of control transistor 100, rendering it nonconducting, thereby opening the circuit through the emitter and collector electrodes and through diode 101 to the base electrodes of transistors 102 and 104. This removes the forward bias supply to transistors 102 and 104, which form the audio switches 36 of the block diagram of FIG. 1. As stated in connection with that diagram, the transistors 102 and 104 are connected to shunt the receiver audio stages, and when they are nonconducting, they permit the audio stages of the receiver to amplify and reproduce the audio signals. Terminals 103 and 105 connected to the emitter electrodes of transistors 102 and 104 can be connected to points in the audio circuit to shunt such points to ground.

The comparator circuits 20 and 35 each include a constant current source connected to the emitters thereof, with the emitters of transistors 85 and 86 being supplied through transistor 106, and the emitters of transistors 95 and 96 being supplied through transistor 107. The two current source transistors are referenced by diode 108 which is connected in series with resistor 109 to the regulated potential line 79 provided by the regulator transistor 73, as previously described.

Also connected to the detector output capacitor 18 is a circuit including transistors 24, 114 and 115. The voltage across capacitor 18 is applied to the base of emitter-follower transistor 24 which has emitter and collector electrodes connected in series with resistor 25 and capacitor 26 to form a charging path for capacitor 26. The capacitor 26 charges to a value related to the charge on capacitor 18. The voltage across this capacitor is applied to the base of PNP transistor 114, the emitter of which is in turn coupled to the base of NPN emitter-follower transistor 115. Transistor 114 provides a voltage shift at its emitter electrode, so that there is essentially no voltage difference between the base of transistor 114 and the emitter of transistor 115. Transistor 115 has its collector-emitter path connected in series with resistor 116 to the junction of resistors 28 and 29. When the voltage rises on capacitor 18 because of an increase of signal (decrease of noise), the increase is coupled through transistors 24, 114 and 115 and resistor 116 to the base of transistor 96, increasing the reference voltage to second comparator 35. When the signal goes off, the voltage on capacitor 18 rapidly drops, which turns off transistor 24. Capacitor 26 discharges slowly through transistor 114 to hold the reference voltage on second comparator 35 at an increased level until capacitor 31 discharges below this reference and this comparator switches.

The reference voltage applied to transistor 96 will increase with strong signals so that a slight decrease in the voltage across capacitor 31 will result in transistor 96 becoming conducting to turn on control transistor 100. This will cause the audio switches to turn on to shunt the audio stages of the receiver. The amount of increase of the second reference voltage is proportional to the voltage on capacitor 26, which in turn is proportional to the voltage on capacitor 18, which depends upon the strength of the received signal. On weak signals, the circuit through transistors 24, 114 and 115 will have substantially no effect on the reference voltage at the base of transistor 96, and the audio stages will remain on until capacitor 31 discharges to a point below that applied to the base of transistor 96. This will allow the audio stages to remain on during fading of the signal, and will provide a relatively long squelch tail. However, for strong signals, transistor 115 will be rendered conducting to increase the voltage applied to the base of transistor 96. In such case, a slight drop in the voltage across capacitor 31 will bring the base of transistor 95 below the second reference voltage to produce switching action to quickly cut off the audio, resulting in a very short squelch tail. For signals of intermediate strengths the length of the squelch tail will be of intermediate values, being inversely proportional to the signal strength.

The operation of the circuit shown in FIG. 2 is illustrated by the curve in FIG. 3 wherein the solid line shows that capacitor 31 charges to a voltage Vmax which is only slightly below the supply voltage, Vs. The Threshold 1 voltage is the voltage applied to the base of transistor 96 by resistors 28 and 29 when transistor 115 is not conducting. Capacitor 31 must therefore discharge for the time period *t*1, which is a relatively long period of time before the Threshold 1 voltage is reached to cause the second comparator to operate to cut off the audio.

When strong signals are received and transistor 115 conducts, the voltage applied through resistor 116 to the divider including resistors 28 and 29 greatly increases the threshold to the level indicated in FIG. 3 as Threshold 2. The capacitor 31 discharges very quickly to Threshold 2, in the time marked *t*2. This results in rapid cut off of the receiver audio for a short squench tail.

The squelch circuit of FIGS. 1 and 2 may in some cases be used with a radio receiver employing tone coded squelch, in addition to the noise operated squelch, as indicated by the Noise Squelch Inhibit block 37 and the Tone Enable block 38 in FIG. 1. For such operation, a terminal 130 is provided which is connected by resistor 131 to the base of control transistor 100. For noise squelch inhibit, ground potential is applied to terminal 130, and transistor 100 is biased to conduction independently of the operation of the noise operated squelch circuit. This applies forward bias through diode 101 to the base electrodes of transistors 102 and 104 to render them conducting to shunt the audio circuits of the receiver. To render the audio of the receiver operative in response to a potential produced by the tone coded squelch circuit, such potential is applied to terminal 132 which is connected through resistor 133 to the base of transistor 134. Transistor 134 is turned on by a positive potential applied to its base, and shunts the output circuit of transistor 100 so that the potential applied to the base electrodes of transistors 102 and 104 drops to ground potential. This renders the transistors 102 and 104 nonconducting so that the shunts across the audio stages provided thereby are removed, and the audio signal is reproduced.

It may also be desired to mute the receiver under certain conditions, as when the receiver is used with a transmitter and it is desired to mute the receiver during transmission. This action is illustrated by the block 39 in FIG. 1. For this purpose, terminal 136 is provided which is connected through the circuit including isolating diode 137 to the base electrodes of transistors 102 and 104. A positive potential applied to terminal 136 is applied through diode 137 to the base electrodes of transistors 102 and 104 to render the same conducting to shunt the audio stages of the receiver, to mute the same. The diode 101 isolates the shunting transistor 134 to prevent this transistor from affecting the muting operation. The diode 137 isolates the squelch circuit from the external circuits connected to terminal 137.

Figures 4, 5, 6:
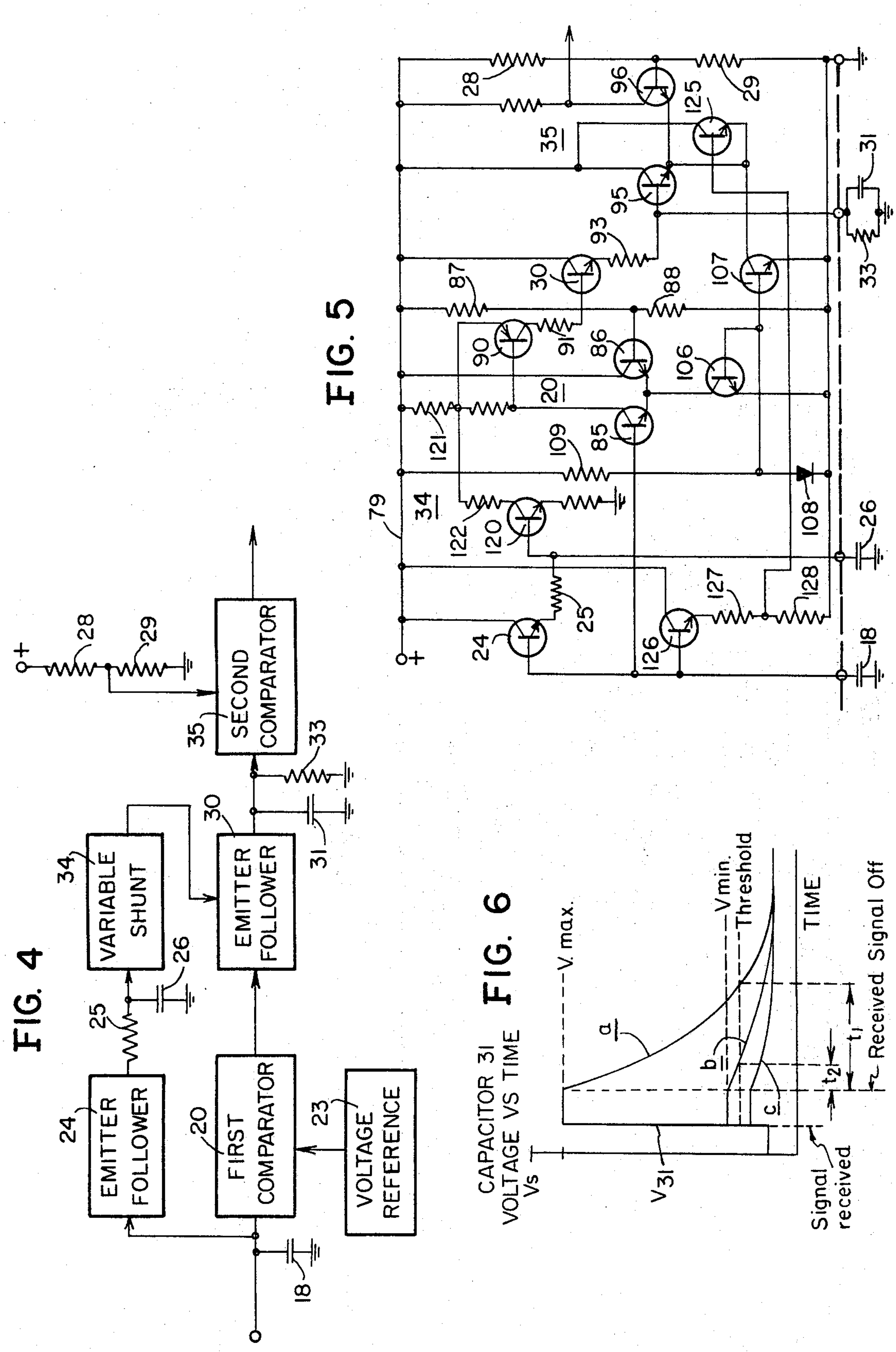
FIG. 4 is a block diagram of a portion of the circuit of FIG. 1 showing a second embodiment thereof.
FIG. 5 is a circuit diagram of the circuit of FIG. 4.
FIG. 6 is a curve illustrating the operation of the circuits of FIGS. 4 and 5.

FIG. 4 illustrates a second embodiment of the invention and shows the portion of the circuit of FIG. 1 extending from the detector filter capacitor 18 to the second comparator 35. The first comparator 20 operates in exactly the same manner as in FIG. 1 to actuate the emitter-follower 30 to charge capacitor 31 when a signal of minimum usable strength is received. Capacitor 31 is discharged slowly by resistor 33 to provide a long time constant, and the voltage across capacitor 31 is applied to the second comparator 35.

The voltage across the detector filter capacitor 18 is also applied to emitter-follower 24 which acts to charge capacitor 26 through resistor 25, as in the system of FIG. 1. The voltage across capacitor 26 is used in a different manner in FIG. 4, and controls the operation of variable shunt circuit 34. The variable shunt circuit 34 is coupled to the emitter-follower 30 and acts to reduce the charging voltage applied by the emitter-follower 30 to capacitor 31. The amount of shunting action depends upon the charge on capacitor 26, which depends on the voltage on capacitor 18 which varies with the level of the received signal. When a strong signal is received, the voltage applied to charge capacitor 31 is substantially reduced so that this voltage is just above the reference voltage applied to the second comparator 35.

Accordingly, on strong signals the second comparator will act very rapidly because the voltage on capacitor 31 is only slightly above the second reference voltage. However, for weak signals, the variable shunt 34 is relatively ineffective so that capacitor 31 charges almost to the full supply voltage. In such case the voltage across capacitor 31 is substantially greater than the reference voltage, and when the signal terminates, a significant time is required for the capacitor 31 to discharge through resistor 33 to the reference value at which the second comparator 35 switches to cause the shunt switches to open to remove the shunts across the receiver audio. This holds the audio operative during weak signal periods in the presence of fade and flutter.

The circuit corresponding to the block diagram of FIG. 4 is shown in FIG. 5. The voltage developed across capacitor 18 is applied to the base of transistor 85 of the first comparator 20, which operates in the same manner as in FIG. 2 to render transistor 90 conducting in response to a signal of a usable level, to in turn render transistor 30 conducting to complete the path for charging capacitor 31. The voltage from capacitor 31 is applied to the base of transistor 95 of the second comparator 35 in the same manner as in FIG. 2. The reference voltage applied to the base of transistor 96 of second comparator 35 is held at a fixed level as determined by resistors 28 and 29.

In FIG. 5, transistor 24 operates in the same manner as in FIG. 2 to charge capacitor 26 through resistor 25 when a voltage is developed across capacitor 18. However, the circuit coupled to capacitor 26 is different and includes transistor 120 having its base connected to capacitor 26. Transistor 120 is rendered conducting when capacitor 26 charges to draw current through resistors 121 and 122. The emitter of transistor 90 is connected to the supply potential on conductor 79 through resistor 121 (rather than directly as in FIG. 2) so that when transistor 120 conducts, the voltage applied to the emitter of transistor 90 is reduced by the voltage drop across resistor 121. This in turn reduces the voltage applied through resistor 91 to the base of transistor 92 to control the conduction of this transistor to charge capacitor 31. Accordingly, capacitor 31 will charge to a lower value when transistor 120 conducts heavily in response to a strong received signal. When the received signal terminates, the voltage across capacitor 31 has only to discharge a small amount to reach the reference on transistor 96 and reduce the conduction of transistor 95 and increase the conduction of transistor 96. This will cause the voltage at the collector of transistor 96 to drop and turn on the control transistor 100 (FIG. 2).

The action of the circuit of FIG. 5 is illustrated in FIG. 6 wherein curve *a* represents the charging of capacitor 31 at low signal levels. In such case, the capacitor will charge to the voltage Vmax and must discharge to the threshold level (voltage on the base of transistor 96) before the audio is cut off. This requires a relatively long time t1 after the signal terminates before the audio turns off. This provides the desired operation at low signal levels so that the audio is not turned off during fading or flutter.

Curve *b* of FIG. 6 shows the operation at strong signal levels during which capacitor 31 charges to the voltage Vmin. This is a much lower voltage than the voltage Vmax reached during weak signals, and is just above the threshold. Accordingly, when the signal terminates and the capacitor 31 starts to discharge, it must only discharge for the much shorter time t2 before the comparator 35 operates to turn off the audio.

In the circuit of FIG. 5, an additional transistor 125 is provided which is connected in parallel with the transistor 95. This transistor is controlled directly from the voltage across the detector filter capacitor 18, being coupled through the level shift circuit consisting of transistor 126 and resistors 127 and 128, to the base of transistor 125. When this circuit is used, the value of resistor 121 can be selected so that on strong signals the voltage to which the capacitor 31 charges will be below the threshold level of second comparator 35. The values of resistors 127 and 128 are chosen so that the voltage applied to the base of transistor 125 increases above the threshold applied to transistor 96 before the charging voltage of capacitor 31 is reduced below the threshold. When a signal is originally received, the circuit will operate as previously described. As a strong signal causes the voltage across capacitor 18 to increase, the charging voltage for capacitor 31 will decrease as previously described and will decrease below the threshold to the level shown by curve *c* in FIG. 6. This will cause the transistor 95 to cut off. However, transistor 125 which is in parallel with transistor 95 will be conducting to hold transistor 96 nonconducting so that the voltage at its collector, which is applied to the switch 100, will remain high.

When the signal terminates, and the voltage across capacitor 18 drops, the voltage applied through the level shift circuit to the base of transistor 125 will also drop to immediately cut off transistor 125 so that transistor 96 will conduct. This produces extremely fast action to cut off the control transistor 100 which controls the audio shunt circuits. Accordingly, by adjusting the circuit so that the voltage on capacitor 31 which is applied to the base of transistor 95 falls below the threshold on strong signals, the action is under the control of the parallel transistor 125, and this transistor will cut off immediately at the termination of the signal to cause a very fast cut off of the audio with minimum squelch tail.

It will be apparent that the circuit of FIG. 5 will operate without the use of transistor 125, as has been described, and this transistor and the level shift circuit coupled thereto can be omitted. However, the addition of transistor 125 makes it possible to provide faster turn off of the audio when a strong received signal terminates.

I claim:

1. A squelch control circuit operated in response to a detected noise voltage including in combination:

filter means having a particular time constant and adapted to receive the detected noise voltage and being responsive thereto to develop a filtered noise voltage;

switch means responsive to an input voltage greater than a first predetermined threshold to be actuated thereby;

means coupling said filter means with the input of said switch means to apply said filtered noise voltage thereto;

charge storage means having a time constant greater than said particular time constant coupled with the output of said switch means for storing a predetermined charge in response to actuation of said switch means to produce a first voltage;

comparator means having first and second inputs and responsive to a voltage at said first input greater than the voltage at said second input to produce a control voltage;

circuit means coupling said charge storage means with said first input of said comparator means for applying said first voltage thereto;

reference voltage means coupled with said second input of said comparator means for applying a reference voltage thereto; and control means coupled to said filter means and providing a control action varying with said filtered noise voltage, said control means being further coupled to one of said charge storage means and said reference voltage means, for changing one of said first voltage and said reference voltage, respectively, in accordance with the level of said filtered noise voltage, to thereby control the development of said control voltage by said comparator means.

2. A squelch control circuit in accordance with claim 1 wherein said control means includes capacitor means, means for charging said capacitor means to a value related to the value of said filtered noise voltage, and means coupled to said capacitor means having a current path controlled by the voltage across said capacitor means.

3. A squelch control circuit in accordance with claim 1 wherein said control means is coupled to said reference voltage means and acts to increase said reference voltage in response to an increase in said filtered noise voltage.

4. A squelch control circuit in accordance with claim 1 wherein said charge storage means includes capacitor means for providing a first voltage of a fixed value, and wherein said reference voltage means includes voltage divider means which provides a reference voltage less than said fixed value, said control means being coupled to said voltage divider means and causing said reference voltage to vary with said filtered noise voltage.

5. A squelch control circuit in accordance with claim 4 wherein said control means includes delay means for delaying the action of said control means on said reference voltage means when the filtered noise voltage drops.

6. A squelch control circuit in accordance with claim 4 wherein said control means includes further capacitor means, means for charging said further capacitor means to a voltage related to said filtered noise voltage, and impedance means controlled by the voltage across said further capacitor means and connected to said voltage divider for changing the reference voltage provided thereby.

7. A squelch control circuit in accordance with claim 1 wherein said control means is coupled to said charge storage means and acts to reduce the charge stored thereby in response to actuation of said switch means so that said first voltage varies inversely with the level of said filtered noise voltage.

8. A squelch control circuit in accordance with claim 7 wherein said charge storage means includes capacitor means across which a voltage is developed, and wherein said reference voltage means provides a fixed reference voltage, with the voltage developed across said capacitor means in response to actuation of said switch means being greater than said fixed reference voltage and varying inversely with the value of said filtered noise voltage.

9. A squelch control circuit in accordance with claim 8 wherein said control means includes delay means for delaying the action thereof to increase the voltage across said capacitor means as the value of the filtered noise voltage decreases.

10. A squelch control circuit in accordance with claim 8 wherein said control means includes a further capacitor and means operating to charge said further capacitor to a voltage related to said filtered noise voltage, and wherein said charge storage means includes means for charging said capacitor means which is coupled to said further capacitor and which provides a charging voltage for said capacitor means which varies inversely with the voltage across said further capacitor.

11. A squelch control circuit in accordance with claim 7 wherein said comparator means has a third input effectively in parallel with said first input, and said comparator means responds to a voltage at one of said first and third inputs which is greater than the voltage at said second input to produce the control voltage, said reference voltage means provides a fixed reference voltage which is greater than said first voltage produced by said charge storage means in response to said filtered noise voltage rising above a particular value, and means coupling said filter means to said third input of said comparator means to apply a voltage thereto to control said comparator means upon the voltage at said first input thereof falling below said reference voltage at said second input.

12. A squelch control circuit in accordance with claim 11 wherein said means coupling said filter means to said third input of said comparator includes level shift means for applying a third voltage to said third input of said comparator means so that said comparator means continues to produce said control voltage, said level shift means causing said third voltage to drop in response to a drop in said filtered noise voltage to rapidly terminate said control voltage.

13. A squelch control circuit operated in response to a detected noise voltage provided at a first terminal for providing a control voltage at a second terminal, and including in combination:

charge storage means for storing a predetermined charge to produce a first voltage;

threshold means coupling said charge storage means to the first terminal and causing said charge storage means to produce said first voltage in response to a detected noise voltage which exceeds a predetermined value;

comparator means having first and second inputs and an output connected to the second terminal, said comparator means being responsive to a voltage at said first input greater than the voltage at said second input to develop a control voltage at said output;

circuit means coupling said charge storage means to said first input of said comparator means for applying said first voltage thereto;

reference voltage means coupled to said second input of said comparator means for applying a reference voltage thereto which has a value less than said first voltage, so that said comparator means produces the control voltage in response to a detected noise voltage which exceeds said predetermined value; and control means coupled to said first terminal and providing a control action varying with said detected noise voltage, said control means being further coupled to one of said charge storage means and said reference voltage means, for changing one of said first voltage and said reference voltage, respectively, in accordance with the level of said detected noise voltage, to thereby control the action of said comparator means to terminate the control voltage when the detected noise voltage drops below said predetermined value.

14. A squelch control circuit in accordance with claim 13 wherein said control means is coupled to said reference voltage means and acts to increase said reference voltage in response to an increase in the detected noise voltage at the first terminal.

15. A squelch control circuit in accordance with claim 13 wherein said control means is coupled to said charge storage means and acts to reduce said first voltage in response to an increase in the detected noise voltage at the first terminal.

* * * * *